(12) United States Patent
Kruckenberg

(10) Patent No.: US 11,338,497 B2
(45) Date of Patent: May 24, 2022

(54) SYSTEMS AND METHODS FOR THERMOFORMING THERMOPLASTIC STRUCTURES

(71) Applicant: ROHR, INC., Chula Vista, CA (US)

(72) Inventor: Teresa Kruckenberg, La Mesa, CA (US)

(73) Assignee: ROHR, INC., Chula Vista, CA (US)

( * ) Notice: Subject to any disclaimer, the term of this patent is extended or adjusted under 35 U.S.C. 154(b) by 225 days.

(21) Appl. No.: 16/674,606

(22) Filed: Nov. 5, 2019

(65) Prior Publication Data

US 2021/0129412 A1 May 6, 2021

(51) Int. Cl.
*B29C 51/22* (2006.01)
*B29C 51/26* (2006.01)
*B29C 51/42* (2006.01)
*B29K 105/00* (2006.01)
*B29K 101/12* (2006.01)

(52) U.S. Cl.
CPC ............ *B29C 51/22* (2013.01); *B29C 51/264* (2013.01); *B29C 51/421* (2013.01); *B29C 2793/0081* (2013.01); *B29K 2101/12* (2013.01); *B29K 2105/256* (2013.01)

(58) Field of Classification Search
None
See application file for complete search history.

(56) References Cited

U.S. PATENT DOCUMENTS

| 5,266,139 A | * | 11/1993 | Yokota ................ B29C 53/8041 156/158 |
| 6,086,696 A | * | 7/2000 | Gallagher ............. B29C 53/562 156/169 |
| 6,701,990 B1 | | 3/2004 | Burley et al. |
| 2019/0016040 A1 | | 1/2019 | Robins et al. |

* cited by examiner

*Primary Examiner* — Monica A Huson
(74) *Attorney, Agent, or Firm* — Snell & Wilmer L.L.P.

(57) ABSTRACT

A system for forming a thermoplastic may comprise a mandrel configured to receive a thermoplastic charge. The mandrel may rotate about a mandrel axis. A series of rollers may be located circumferentially about the mandrel and configured to apply radially inward pressure. A heating element may be located upstream of the series of rollers.

18 Claims, 6 Drawing Sheets

SYSTEMS AND METHODS FOR THERMOFORMING THERMOPLASTIC STRUCTURES

FIELD

The present disclosure relates generally to thermoplastics manufacturing, and more specifically to systems and methods for forming thermoplastic structures.

BACKGROUND

Various industries include components having multi-dimensional charges for various uses. For example, the aerospace industry utilizes nacelles for various applications for providing a protective housing around adjacent components as well as for providing an aerodynamic surface for reducing drag, among other applications. For example, a fan cowl is used for housing various components of a turbine engine and provides an aerodynamic surface for the turbine engine and related systems. A fan cowl outer skin is typically made from metal or fiber-reinforced materials (e.g., carbon fiber). A fan cowl may be formed using one or multiple charges that are connected together to form a single, large cowl half coupled to the nacelle structure via a hinge. Some fan cowl outer skins may be made via a carbon fiber layup process that comprises various stacking and curing steps that can take many hours to complete.

SUMMARY

A system for forming a thermoplastic charge is disclosed herein. In accordance with various embodiments, the system may comprise a mandrel, a series of rollers, and a heating element. The mandrel may be configured to receive the thermoplastic charge. The mandrel may rotate about a mandrel axis. The series of rollers may be located circumferentially about the mandrel and may be configured to apply radially inward pressure. The heating element may be located upstream of the series of rollers.

In various embodiments, a tensioning assembly may be configured to apply force in a first axial direction and a second axial direction opposite the first axial direction. In various embodiments, a cooling element may be configured to output an airflow.

In various embodiments, a first roller of the series of rollers may be axially aligned with a first portion of a radially outward surface of the mandrel. The first portion of the radially outward surface may be non-parallel to the mandrel axis.

In various embodiments, the series of rollers may further comprise a second roller located circumferentially apart from the first roller. In various embodiments, the second roller may be axially aligned with a second portion of the radially outward surface, and an angle of the first portion of the radially outward surface relative to the mandrel axis may be greater than an angle of the second portion of the radially outward surface relative to the mandrel axis.

A method for forming a thermoplastic component is also disclosed herein. In accordance with various embodiments, the method may comprise heating a thermoplastic charge to a forming temperature, locating the thermoplastic charge over a rotating mandrel, compressing the thermoplastic charge between the rotating mandrel and a series of rollers, and cooling the thermoplastic charge to a hardened temperature on the rotating mandrel. The hardened temperature being cooler than the forming temperature.

In various embodiments, the method may further comprise applying tension to the thermoplastic charge simultaneously with the heating the thermoplastic charge, the compressing the thermoplastic charge, and the cooling the thermoplastic charge.

In various embodiments, heating the thermoplastic charge to the forming temperature may include locating a first flexible heater over the thermoplastic charge. In various embodiments, heating the thermoplastic charge to the forming temperature may further include locating a second flexible heater over the thermoplastic charge.

In various embodiments, the method may further comprise trimming the thermoplastic charge. In various embodiments, the method may further comprise forming a buildup layer over the thermoplastic charge.

In various embodiments, cooling the thermoplastic charge to the hardened temperature may include directing a cooling airflow toward the thermoplastic charge.

A method for forming a thermoplastic component, in accordance with various embodiments, may comprise heating a thermoplastic charge to a forming temperature, locating the thermoplastic charge over a mandrel configured to rotate about a mandrel axis, and compressing the thermoplastic charge between the mandrel and a series of rollers.

In various embodiments, the method may further comprise disposing a flexible heater on a surface of the thermoplastic charge. In various embodiments, the method may further comprise cooling the thermoplastic charge to a hardened temperature on the mandrel, the hardened temperature being cooler than the forming temperature.

In various embodiments, a first roller of the series of rollers may be axially aligned with a first portion of a radially outward surface of the mandrel. The first portion of the radially outward surface may be non-parallel to the mandrel axis.

In various embodiments, the series of rollers may further comprise a second roller located circumferentially apart from the first roller. The second roller the second roller may be axially aligned with a second portion of the radially outward surface, and an angle of the first portion of the radially outward surface relative to the mandrel axis may be greater than an angle of the second portion of the radially outward surface relative to the mandrel axis.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not for limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

A first component that is "radially outward" of a second component means that the first component is positioned a greater distance away from a common axis of the first and second components as compared to the second component. A first component that is "radially inward" of a second component means that the first component is positioned closer to a common axis of the first and second components than the second component.

The thermoplastic forming process, as described herein, may provide a relatively quick manufacturing process, e.g., as compared to automated fiber placement systems, of a thermoplastic charge, such as a charge employed as the outer skin for a fan cowl. The thermoplastic forming process, as described herein, may provide a manufacturing process for transforming a flat thermoplastic charge into a relatively complex geometry, while minimizing, or eliminating, wrinkling.

Figure 1A:
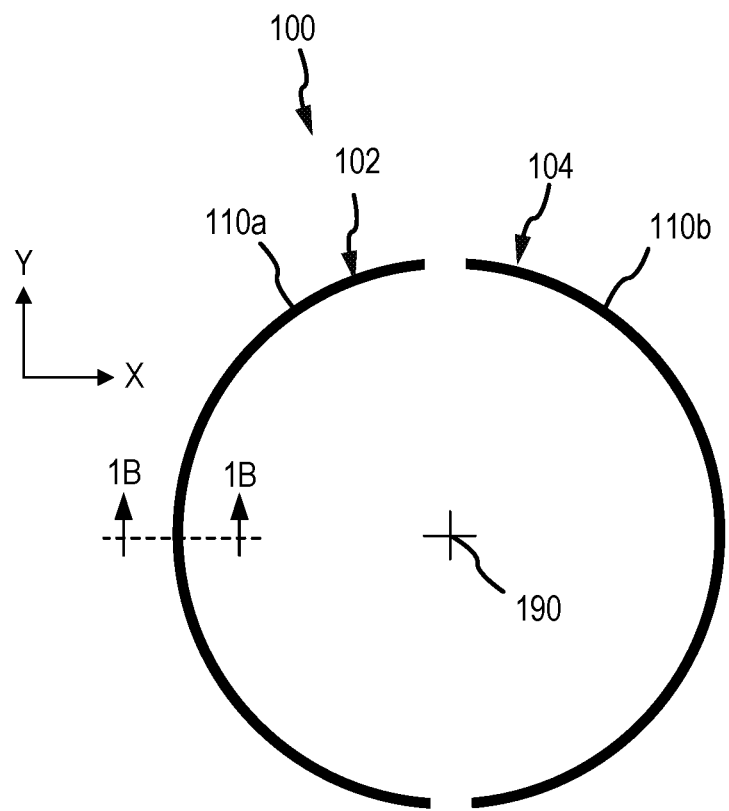
FIG. 1A illustrates a front-view profile of a fan cowl, in accordance with various embodiments.

With reference to FIG. 1A, a fan cowl 100 is illustrated, in accordance with various embodiments. Fan cowl 100 may include a first fan cowl half 102 and a second fan cowl half 104. First fan cowl half 102 may include a first outer skin 110a. Second fan cowl half 104 may include a second outer skin 110b. First outer skin 110a and second outer skin 110b may each comprise a semi-cylindrical geometry when viewed from the aft direction, as shown in the illustrated embodiment. First and second outer skins 110a, 110b may define a centerline axis 190. Stated differently, first and second outer skins 110a, 110b may be bent around centerline axis 190.

Figure 1B:
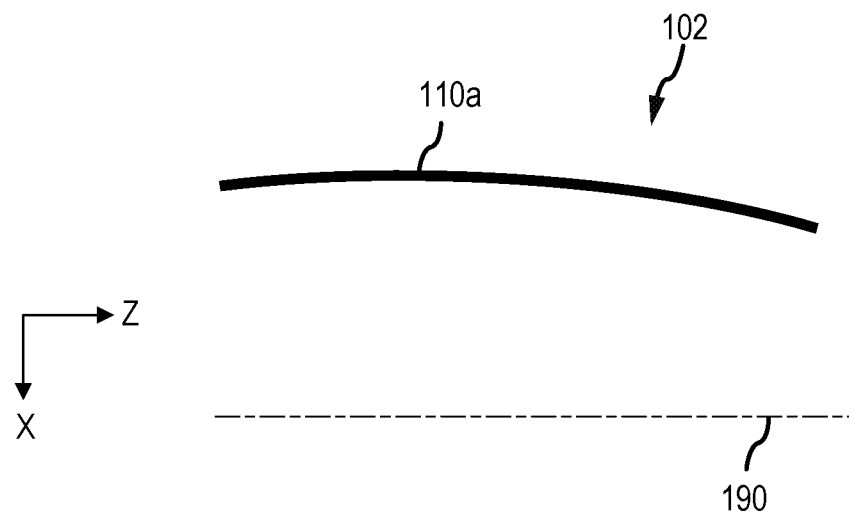
FIG. 1B illustrates a section view of a first fan cowl half of FIG. 1A, in accordance with various embodiments.

With reference to FIG. 1B, a section view of first fan cowl half 102 is illustrated, in accordance with various embodiments. First outer skin 110a may be contoured along the longitudinal direction (i.e., the Z-direction). Stated differently, first outer skin 110a may comprise a non-linear geometry (e.g., rounded) along the longitudinal direction. While FIG. 1B illustrates first outer skin 110a, it should be understood that second outer skin 110b, with momentary reference to FIG. 1A, may include the elements and functionalities as described herein with respect to first outer skin 110a.

Returning to FIG. 1A, first and second outer skins 110a, 110b may be made from a fiber reinforced thermoplastic. In various embodiments, first and second outer skins 110a, 110b may formed from a carbon fiber, glass fiber, aramid fiber, or any other suitable fiber in a thermoplastic matrix. Various thermoplastics may be used for forming a fiber reinforced thermoplastic component, as described herein, including amorphous thermoplastics (e.g., polyetherimide (PEI), polycarbonate (PC), polysulfone (PSU), polyethersulfone (PES)), semi crystalline thermoplastics (e.g., polyvinylidene fluoride (PVDF), polytetrafluoroethylene (PTFE), polyphenylene sulfide (PPS), polyetheretherketone (PEEK), polyetherketoneketone (PEKK), polyaryletherketone (PAEK)), or any other suitable thermoplastic.

In accordance with various embodiments, first and second outer skins 110a, 110b may be manufactured using a thermoplastic forming process. First and second outer skins 110a, 110b may be manufactured as a single, monolithic structure for large applications, such as a fan cowl. In this regard, it may be desirable to form first and second outer skins 110a, 110b to be contoured. Furthermore, because first and second outer skins 110a, 110b serve as an aerodynamic surface in fan cowl applications, it may be desirable for first and second outer skins 110a, 110b to be formed having a smooth outer surface and to minimize wrinkling during the forming process. In this regard, first and second outer skins 110a, 110b may be manufactured using a thermoplastic forming process, as described herein.

Figure 2A:
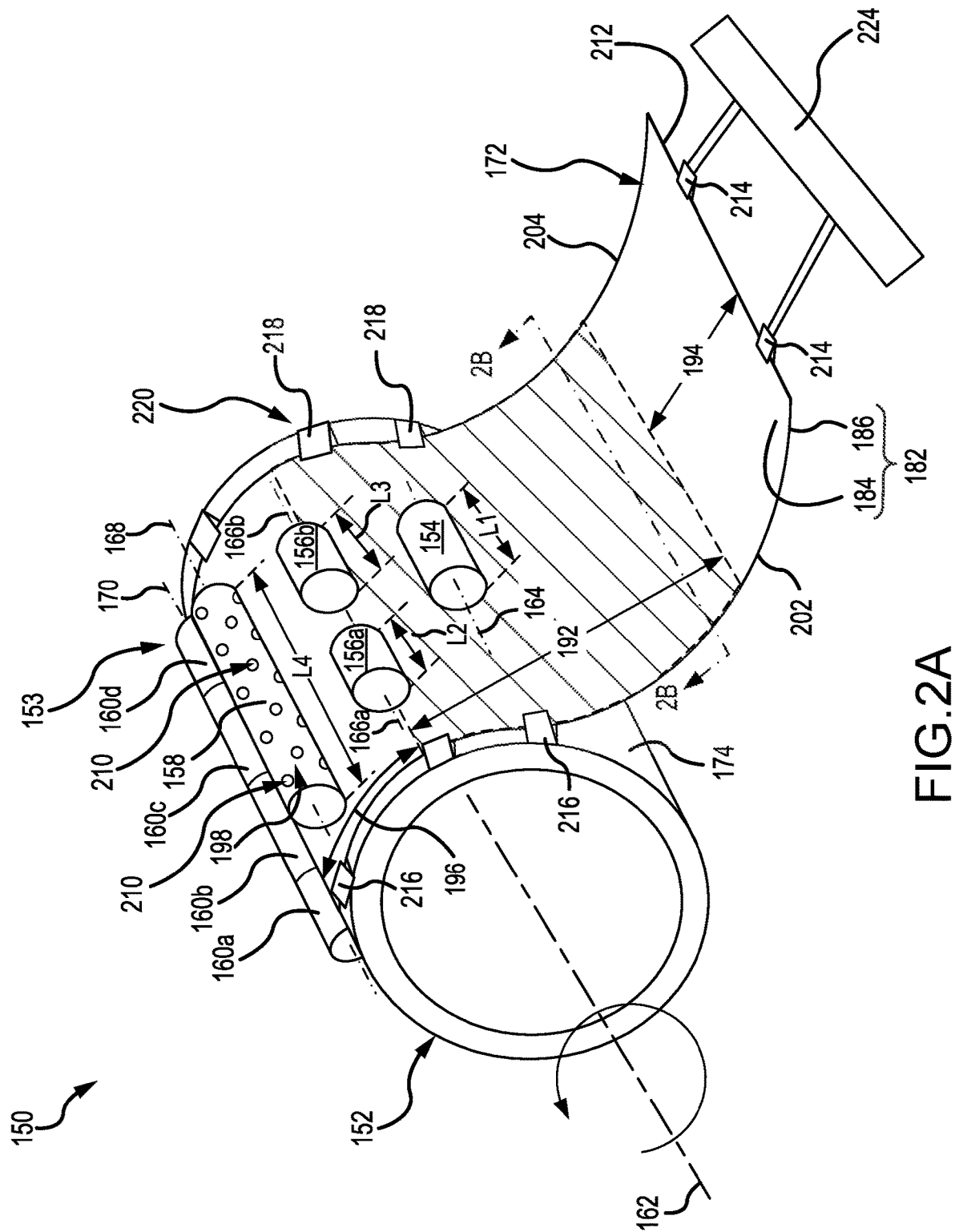
FIG. 2A illustrates a system for forming a fiber reinforced thermoplastic charge, in accordance with various embodiments.

With reference to FIG. 2A, a system 150 for forming a thermoplastic charge is illustrated, in accordance with various embodiments. System 150 may include a mandrel 152 and a series of rollers 153, including, for example, first roller 154, second rollers 156a and 156b, third roller 158, and fourth rollers 160a, 160b, 160c, and 160d, located circumferentially about mandrel 152. Mandrel 152 may be configured to rotate about mandrel axis 162. First roller 154 may be configured to rotate about first roller axis 164. Second roller 156a may be configured to rotate about second roller axis 166a. Second roller 156b may be configured to rotate about second roller axis 166b. Third roller 158 may be configured to rotate about third roller axis 168. Fourth rollers 160a, 160b, 160c, 160d may be configured to rotate about fourth roller axis 170. First roller 154 may be located a predetermined circumferential distance from second rollers 156a, 156b. Second rollers 156a, 156b may be located circumferentially between third roller 158 and first roller 154. Third roller 158 may be located circumferentially between second rollers 156a, 156b and fourth rollers 160a, 160b, 160c, 160d. Second roller 156a may be located a predetermined axial distance from second roller 156b. As used herein, "axial" refers to directions parallel to mandrel axis 162. As used herein, "radial" refers to directions orthogonal to mandrel axis 162. As used herein, "circumferential" and refers to directions about mandrel axis 162. In various embodiments, mandrel axis 162 may be parallel to centerline axis 190 in FIG. 1A.

Mandrel 152 may be configured to receive a thermoplastic charge 172. In various embodiments, thermoplastic charge 172 may include multiple stacked layers of fiber reinforced thermoplastics. A radially outward surface 174 of mandrel 152 may have a contour matching, or complementing, the desired geometry of first and second outer skins 110a, 110b, with momentary reference to FIGS. 1A and 1B. System 150 is configured such that as mandrel 152 rotates about mandrel axis 162, thermoplastic charge 172 is located on and/or over radially outward surface 174 of mandrel 152.

First roller 154, second rollers 156a, 156b, third roller 158, and fourth rollers 160a, 160b, 160c, 160d may each be configured to apply a pressure to thermoplastic charge 172 in a radially inward direction. The pressure applied by first roller 154, second rollers 156a, 156b, third roller 158, and/or fourth rollers 160a, 160b, 160c, 160d may cause thermoplastic charge 172 to form to the contour of mandrel 152, and, in particular, to form to the contour of radially outward surface 174 of mandrel 152. In various embodiments, second roller axis 166b may be non-parallel to second roller axis 166a. In various embodiments, the axis of rotation of at least one of fourth rollers 160a, 160b, 160c, and 160d may be non-parallel to the axis of rotation at one of the others of 160a, 160b, 160c, and 160d. The axis of rotation being non-parallel may allow the rollers to better form thermoplastic charge 172 to the contour of radially outward surface 174.

System 150 may be configured such that, during the initial placement of thermoplastic charge 172 over rotating mandrel 152, thermoplastic charge 172 contacts (i.e., is compressed by) first roller 154 prior to contacting (i.e., prior to being compressed by) second rollers 156a, 156b. In various embodiments, the location of the rollers is selected to coincide with areas of radially outward surface 174 having a greater grade of contouring or loft. For example, first roller 154 and/or second rollers 156a, 156b may each be located over an area where radially outward surface 174 of mandrel 152 is non-parallel or oriented at an increased angle relative to mandrel axis 162. In various embodiments, the first roller 154 is axially aligned with (i.e., overlapping in the radial direction) a first portion of radially outward surface 174, the first portion of radially outward surface 174 having an axial length L1. Second roller 156a is axially aligned with (i.e., overlapping in the radial direction) a second portion of radially outward surface 174, the second portion of radially outward surface 174 having an axial length L2. The second portion of radially outward surface 174 may axially overlap the first portion of radially outward surface 174. Second roller 156b is axially aligned with (i.e., overlapping in the radial direction) a third portion of radially outward surface 174, the third portion of radially outward surface 174 having an axial length L3. The third portion of radially outward surface 174 may axially overlap the first portion of radially outward surface 174. In various embodiments, the first portion of radially outward surface 174 (i.e., the portion aligned with first roller 154) may be oriented at a greater angle relative to mandrel axis 162, as compared the angle relative to mandrel axis 162 of the second portion of radially outward surface 174 (i.e., the portion aligned with second roller 156a). The location of the rollers may be selected to optimize the removal of wrinkles from thermoplastic charge 172. While system 150 is illustrated as have four sets of rollers (i.e., first roller 154, second rollers 156a, 156b, third roller 158, fourth rollers 160a, 160b, 160c, 160d), it is further contemplated and understood that system 150 may include any number of roller sets, with each roller set including any number of rollers.

In various embodiments, system 150 may be configured such that the axial distance between the axial ends of the rollers and the axial center of the thermoplastic charge 172 increases about the circumference of mandrel 152. The axial center of thermoplastic charge 172 being located halfway between a first axial end 202 and a second axial end 204 of thermoplastic charge 172. First axial end 202 may be located at the forward end of first and second outer skins 110a, 110b, with momentary reference to FIG. 1A, and second axial end 204 may be located at the aft end of first and second outer skins 110a, 110b. In this regard, system 150 may be configured such that the axial length of thermoplastic charge 172 that is compressed by each set of rollers increases about the circumference of mandrel 152. For example, in various embodiments, first roller 154 may be located proximate the axial center of thermoplastic charge 172 and may compress an axial length L1 of thermoplastic charge 172. Second roller 156a may be closer to first axial end 202 as compared to first roller 154 and may compress an axial length L2 of thermoplastic charge 172. Second roller 156b may be located closer to second axial end 204 as compared to first roller 154 and may compress an axial length L3 of thermoplastic charge 172. Third roller 158 may be located closer to first axial end 202 as compared to second roller 156a, and closer to second axial end 204 as compared second roller 156b, and may compress an axial length L4 of thermoplastic charge 172. Fourth rollers 160a, 160b, 160c, 160d may extend from first axial end 202 of thermoplastic charge 172 to second axial end 204 of thermoplastic charge 172, and may compress an entire axial length of thermoplastic charge 172.

System 150 includes a heating element 182 configured to heat thermoplastic charge 172 to a sufficient forming temperature, wherein the thermoplastic charge 172 becomes pliable for forming purposes. In accordance with various embodiments, a pliable forming temperature for a thermoplastic charge may be between 190° and 750° Fahrenheit (F) (87.8°-398.9° Celsius (C)). In various embodiments, the pliable forming temperature for a thermoplastic charge may be a temperature greater than a melting point of the thermoplastic charge. For example, a thermoplastic charge 172 having a melting point of 649° F. (343° C.) and a glass transition temperature of 249° F. (143° C.) may be heated to a forming temperature of 649° F. (343° C.) or greater. The suitable pliable forming temperature may vary depending on the particular thermoplastic material being used, as well as other factors, such as the thickness of thermoplastic charge 172. As used herein, the term "forming temperature" may refer to a range of temperatures, wherein thermoplastic charge 172 is suitable for forming (usually at or above the melting point).

In various embodiments, mandrel 152 may be heated prior to application of thermoplastic charge 172. Mandrel 152 may be heated to a temperature approximately equal to or just less than the glass transition temperature of the thermoplastic charge 172. For example, mandrel 152 may be heated to between 200° F. and 249° F. (93° C. and 143° C.) for a thermoplastic charge 172 having a glass transition temperature of 249° F. (143° C.).

Figure 2B:
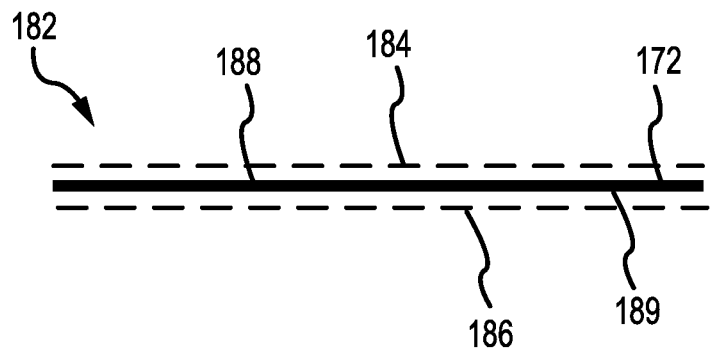
FIG. 2B illustrates a cross-section view of a heating element and a fiber reinforced thermoplastic charge, in accordance with various embodiments.

In accordance with various embodiments, and with additional reference to FIG. 2B, thermoplastic charge 172 may be heated using one or more flexible heaters, such as first flexible heater 184 and/or second flexible heater 186. Stated differently, heating element 182 may include first flexible heater 184 and/or second flexible heater 186. First flexible heater 184 and second flexible heater 186 may each comprise an electrical resistance heater in blanket form. For example, first flexible heater 184 and second flexible heater 186 may each comprise a sheet of a flexible material, such as a polymer, for example, with built-in electrical resistors configured to conduct heat in response to an electrical current being applied therethrough. First flexible heater 184 may be placed against a first surface 188 of thermoplastic charge 172. Second flexible heater 186 may be placed against an opposing, second surface 189 of thermoplastic charge 172. In this regard, second flexible heater 186 may be placed over thermoplastic charge 172 opposite from first flexible heater 184. In various embodiments, only one flexible heater (e.g., either first flexible heater 184 or second flexible heater 186) may be employed to heat thermoplastic charge to the forming temperature.

Returning to FIG. 2A, in various embodiments, first flexible heater 184 and/or second flexible heater 186 may be configured to heat thermoplastic charge 172 in zones. For example, first flexible heater 184 and/or second flexible heater 186 may be selectively powered to heat a portion 192 of thermoplastic charge 172 prior to the portion being applied to mandrel 152. In this regard, heating element 182 may make portion 192 of thermoplastic charge 172 pliable, while non-heated portions 194 may be non-pliable or hardened. In various embodiments, first flexible heater 184 and/or second flexible heater 186 may be selectively powered apply heat to portion 192 of thermoplastic charge 172 prior to portion 192 contacting first roller 154 and/or second rollers 156a, 156b. In this regard, heating element 182 (i.e., first flexible heater 184 and/or second flexible heater 186) may be configured to apply heat to portions of thermoplastic charge 172 that are upstream of first roller 154 and second rollers 156a, 156b. In various embodiments, heating element 182 may be configured to apply heat to portions of thermoplastic charge 172 that are in contact with first roller 154 and second rollers 156a, 156b, and remove heat (i.e., turn-off first flexible heater 184 and/or second flexible heater 186) from the portions 196 of the thermoplastic charge 172 that have rotated past second rollers 156a, 156b. In various embodiments, heating element 182 may be configured to remove heat (i.e., turn-off first flexible heater 184 and/or second flexible heater 186) from the portions the thermoplastic charge 172 that have rotated past first roller 154. In this regard, thermoplastic charge 172 may be heated to increase pliability prior to contacting, and/or during contact with, first roller 154 and/or second rollers 156a, 156b, and then cooled after contacting first roller 154 and/or second rollers 156a, 156b so that thermoplastic charge 172 may harden.

In various embodiments, a cooling element 198 may be configured to cool thermoplastic charge 172 prior to and/or during contact with third roller 158. For example, a plurality of nozzles 210 may direct a cooling airflow at thermoplastic charge 172. In various embodiments, nozzles 210 may be located on third roller 158. In various embodiments, cooling element 198 (e.g., nozzles 210) may be located circumferentially between third roller 158 and second rollers 156a, 156b. In this regard, system 150 is configured to cool the portion 196 of thermoplastic charge 172 that has passed through first roller 154 and second roller 156a, 156b, while third roller 158 applies radially inward pressure (i.e., compresses) portion 196. In various embodiments, fourth rollers 160a, 160b, 160c, 160d may include nozzle similar to nozzles 210 and/or a cooling element, similar to cooling element 198, may be located circumferentially between third roller 158 and fourth rollers 160a, 160b, 160c, 160d, such that fourth rollers 160a, 160b, 160c, 160d apply radially inward pressure during cooling of thermoplastic charge 172. In various embodiments, the rotation speed of mandrel 152 and/or the temperature of cooling element 198 is selected such that a temperature of the portion of thermoplastic charge 172 rotating past, or out of contact with, fourth rollers 160a, 160b, 160c, 160d will be less than the glass transition temperature of thermoplastic charge 172.

In various embodiments, system 150 includes a tensioning assembly 220. Tensioning assembly 220 may be configured to place thermoplastic charge 172 in tension. For example, one or more first clips, or clamps, 214 may be attached to a first circumferential end 212 of thermoplastic charge 172. In various embodiments, first clips 214 may extend along an entire axial length of thermoplastic charge 172 (i.e., from first axial end 202 to second axial end 204 of thermoplastic charge 172). First circumferential end 212 may be the last, or final, portion of thermoplastic charge 172 to be located on mandrel 152. In various embodiments, thermoplastic charge 172 may be released from first clips 210 after first circumferential end 212 is placed onto mandrel 152. In various embodiments, first clips 214 may be coupled to an automated, or "robotic" arm 224. Automated arm 224 may translate (e.g., radially, axially, circumferentially, etc.) relative to mandrel 152 to facilitate application of thermoplastic charge 172 onto mandrel 152. Automated arm 224 may apply a radially outward force, or a force generally away from mandrel 152, to thermoplastic charge 172, to minimize wrinkling of thermoplastic charge 172 as the thermoplastic charge 172 is heated to the forming temperature, (i.e., as thermoplastic charge 172 becomes more pliable), as well as during the forming process, wherein thermoplastic charge 172 is compressed by the rollers to a fully contoured geometry.

Tensioning assembly 220 may include one or more second clips, or clamps, 216 and one or more third clips, or clamps, 218. Second clips 216 and third clips 218 may be coupled to mandrel 152. Second clips 216 may be configured to attach to first axial end 202 of thermoplastic charge 172. Third clips 218 may be configured to attach to second axial end 204 of thermoplastic charge 172. In various embodiments, second clips 216 and third clips 218 may be configured to translate axially, radially, and/or circumferentially to maintain tension in thermoplastic charge 172. For example, tensioning motors and/or biasing members may be operationally coupled to second clips 216 and third clips 218. The tensioning motors and/or biasing members may be configured to cause second clips 216 and third clips 218 to apply force in opposing directions to thermoplastic charge 172, to maintain or increase a tension in thermoplastic charge 172 and minimize wrinkling of thermoplastic charge 172. In various embodiments, the edge or area where thermoplastic charge 172 is clipped to mandrel 152 may be an area that is not heated or remains at a temperature less than the glass transition temperature of thermoplastic charge 172. For example, the areas contacted by first clips 214, second clips 216, and/or third clips 318 may be outside of first and second flexible heaters 184, 186. Locating the clips in portions of thermoplastic charge 172 which are not heated and/or do not experience temperatures above the glass transition temperature tends to facilitate a consistent tension being applied to the fibers of thermoplastic charge 172.

Figure 2C:
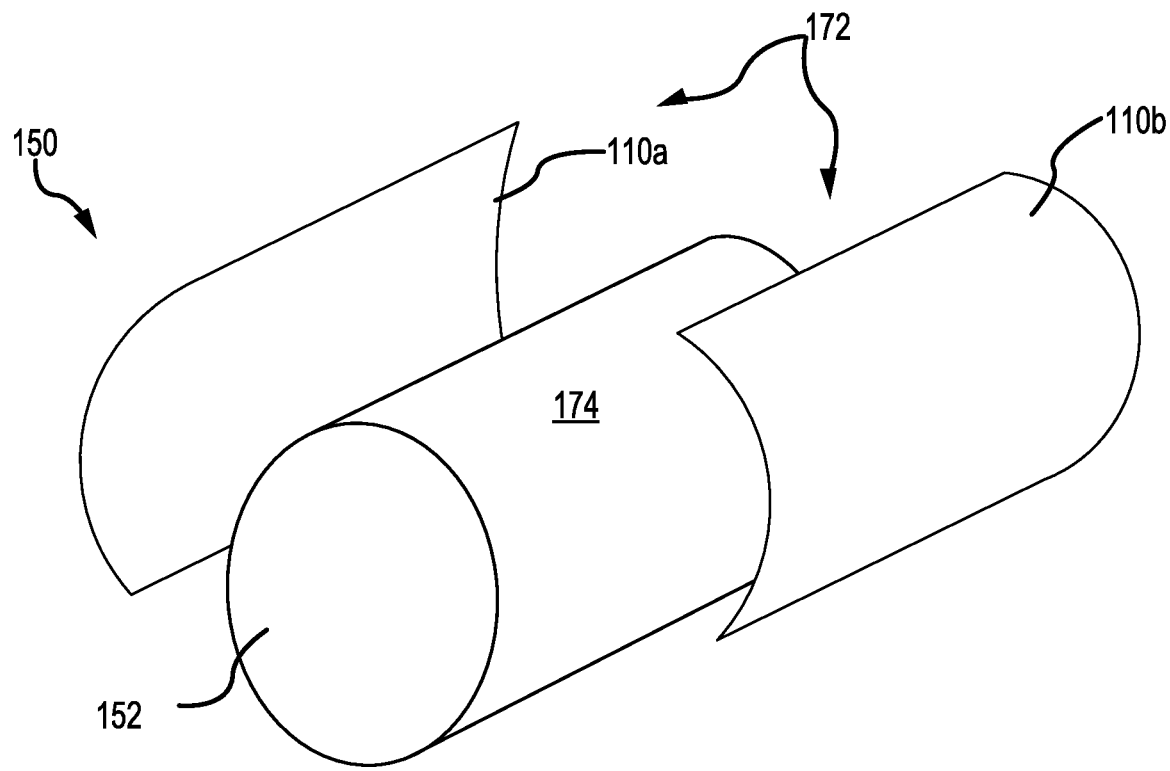
FIG. 2C illustrates two fan cowl outer skin halves formed from a fiber reinforced thermoplastic charge, in accordance with various embodiments.

With reference to FIG. 2C, mandrel 152 may continue to rotate as thermoplastic charge 172 is cooled (i.e., with heating element 182 turned-off). In this regard, thermoplastic charge 172 is cooled under tension from tensioning assembly 220 and pressure from, for example, third roller 158 and fourth rollers 160a, 160b, 160c, 160d. In response to thermoplastic charge 172 being sufficiently cooled to a hardened temperature, thermoplastic charge 172 may be removed from mandrel 152 and trimmed, or cut, to the desired dimensions of first and second outer skins 110a, 110b. The term "hardened temperature," as used herein, refers to a temperature of thermoplastic charge 172, wherein the thermoplastic charge 172 and/or first and second outer skins 110a, 110b is/are sufficiently hardened such that thermoplastic charge 172 and/or first and second outer skins 110a, 110b may be handled and transferred while generally maintaining their shape. The hardened temperature is cooler than the forming temperature and, in various embodiments may be equal to or less than the glass transition temperature of thermoplastic charge 172. In this manner, thermoplastic charge 172 and/or first and second outer skins 110a, 110b may be transferred without substantially losing its/their shape. It is contemplated and understood that thermoplastic charge 172 and/or first and second outer skins 110a, 110b may exhibit a relative degree of bendability and/or flexibility at the hardened temperature. In various embodiments, thermoplastic charge 172 is cooled by turning off heating element 182, thereby allowing heat from thermoplastic charge 172 to dissipate.

While FIGS. 2A, 2B, and 2C illustrate thermoplastic charge 172 forming both first outer skin 110a and second outer skin 110b, it is further contemplated and understood that system 150 may be employed to form one or the other of first outer skin 110a and second outer skin 110b. For example, in various embodiments, thermoplastic charge 172 may be configured to cover approximately 180° of mandrel 152.

Figure 3:
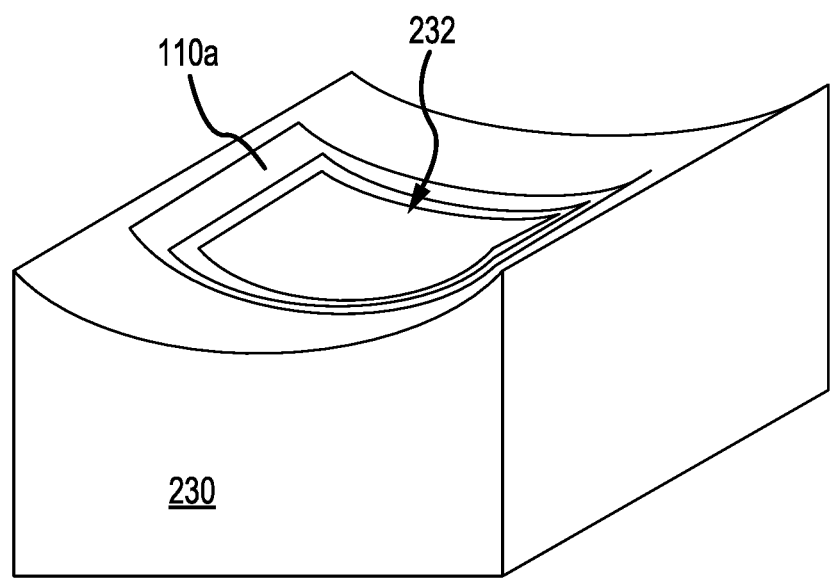
FIG. 3 illustrates a layup of buildup layers over a fan cowl outer skin half, in accordance with various embodiments.

With reference to FIG. 3, in various embodiments, after trimming first outer skin 110a, stiffeners, doublers, or other buildup layers 232 may be added to first outer skin 110a. In this regard, first outer skin 110a and the additional buildup layers 232 may be located over a mold tool 230. Buildup layers 232 may be attached to first outer skin 110a using a suitable attachment technique (e.g., ultrasonic welding, thermo-pressing, etc.).

Figure 4:
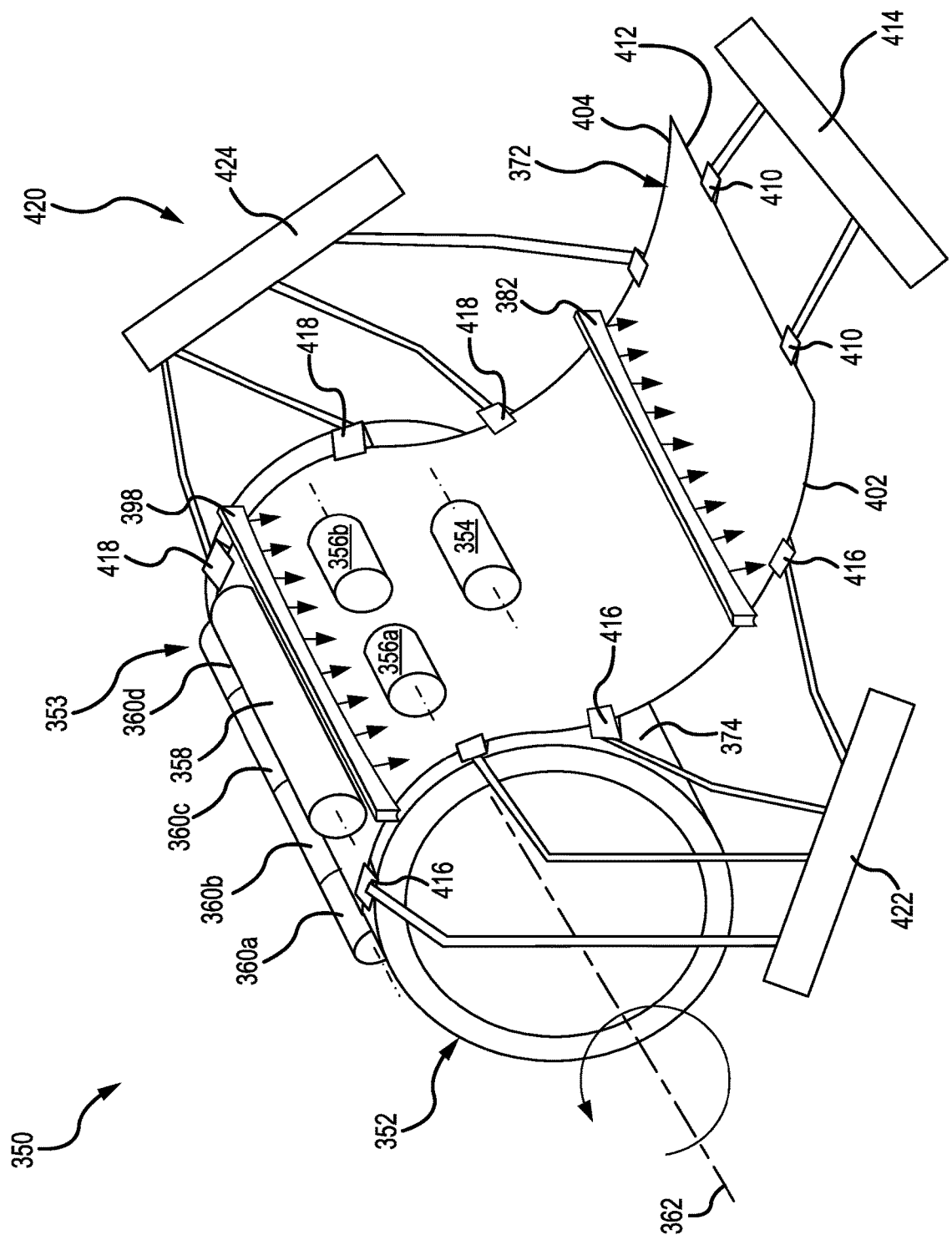
FIG. 4 illustrates a system for forming a fiber reinforced thermoplastic charge, in accordance with various embodiments.

With reference to FIG. 4, a system 350 for forming a thermoplastic charge is illustrated, in accordance with various embodiments. System 350 may include a mandrel 352 and a series of rollers 353 similar to the series of rollers 153 in FIG. 2A. The series of rollers 353 may include, for example, first roller 354, second rollers 356a and 356b, third roller 358, and fourth rollers 360a, 360b, 360c, and 360d, located circumferentially about mandrel 352. Mandrel 352 may be configured to rotate about mandrel axis 362.

Mandrel 352 may be configured to receive a thermoplastic charge 372. In various embodiments, thermoplastic charge 372 may include multiple stacked layers of fiber reinforced thermoplastics. A radially outward surface 374 of mandrel 352 may have a contour matching, or complementing, the desired geometry of first and second outer skins 110a, 110b, with momentary reference to FIGS. 1A and 1B.

System 350 may be configured such that, during the initial placement of thermoplastic charge 372 over rotating mandrel 352, thermoplastic charge 372 contacts (i.e., is compressed by) first roller 354 prior to contacting (i.e., prior to being compressed by) second rollers 356a, 356b. While system 350 is illustrated as have four sets of rollers (i.e., first roller 354, second rollers 356a, 356b, third roller 358, fourth rollers 360a, 360b, 360c, 360d), it is further contemplated and understood that system 350 may include any number of roller sets, with each roller set including any number of rollers.

System 350 includes a heating element 382 configured to heat thermoplastic charge 372 to a sufficient forming temperature, wherein the thermoplastic charge 372 becomes pliable for forming purposes. In various embodiments, heating element 382 may be configured to heat thermoplastic charge 372 by transferring thermodynamic energy, to thermoplastic charge 372. For example, heating element 382 may include heat lamps (e.g., infrared heat lamps) that heat thermoplastic charge 372 by transferring electromagnetic radiation to thermoplastic charge 372. In various embodiments, one or more flexible heaters (similar to first and second flexible heaters 184, 186 in FIG. 2B) may be used in conjunction with heating element 382. For example, a flexible heater may be located over a surface thermoplastic charge 372 that is opposite heating element 382. While heating element 382 is described as transferring electromagnetic radiation, it is contemplated that any suitable method of heating may be employed to heat thermoplastic charge 372

In various embodiments, mandrel 352 may be heated prior to application of thermoplastic charge 372. Mandrel 352 may be heated to a temperature approximately equal to or just less than the glass transition temperature of the thermoplastic charge 372. For example, mandrel 352 may be heated to between 200° F. and 249° F. (93° C. and 143° C.) for a thermoplastic charge 372 having a glass transition temperature of 249° F. (143° C.) a temperature.

In various embodiments, heating element 382 may be configured to heat thermoplastic charge 372 as it is applied to mandrel 152, such that the portion of thermoplastic charge 372 that is about to be applied to mandrel 152 is heated and becomes pliable. In this regard, heating element 382 may make thermoplastic charge 372 pliable, before thermoplastic charge 372 is contacted and compressed by first roller 354. Stated differently, heating element 382 may be upstream from first roller 354. A first component that is "upstream" of a second component means that the first component will contact (thermally or physically) a thermoplastic charge prior to the second component contacting (thermally or physically) the thermoplastic charge.

In various embodiments, a cooling element 398 may be configured to cool thermoplastic charge 372 prior to and/or during contact with third roller 358. Cooling element 398 may be configured to direct a cooling airflow at thermoplastic charge 372. System 350 is configured to cool the portions of thermoplastic charge 372 that have passed through first roller 354 and second rollers 356a, 356b, while third roller 358 applies radially inward pressure (i.e., compresses). In various embodiments, a cooling element, similar to cooling element 398, may be located circumferentially between third roller 358 and fourth rollers 360a, 360b, 360c, 360d. In various embodiments, the rotation speed of mandrel 352 and/or the temperature of cooling element 398 is/are selected such that a temperature of the portion of thermoplastic charge 372 rotating past, or out of contact with, fourth rollers 360a, 360b, 360c, 360d will be less than the glass transition temperature of thermoplastic charge 372.

In various embodiments, system 350 includes a tensioning assembly 420. Tensioning assembly 420 may be configured to place thermoplastic charge 372 in tension, thereby reducing occurrences of wrinkles. For example, one or more first clips, or clamps, 410 may be attached to a first circumferential end 412 of thermoplastic charge 372. In various embodiments, first clips 410 may extend along an entire axial length of thermoplastic charge 372 (i.e., from a first axial end 402 of thermoplastic charge 372 to a second axial end 404 of thermoplastic charge 372). First circumferential end 412 may be the last, or final, portion of thermoplastic charge 372 to be located on mandrel 352. In various embodiments, thermoplastic charge 372 may be released from first claims 410 in response to first circumferential end 412 being placed onto mandrel 352.

First clips 410 may be coupled to an automated, or "robotic" arm 414. Automated arm 414 may translate (e.g., radially, axially, circumferentially, etc.) relative to mandrel 352 to facilitate application of thermoplastic charge 372 onto mandrel 352. Automated arm 414 may apply a radially outward force (e.g., a force generally away from mandrel 352) to thermoplastic charge 372 to minimize wrinkling of thermoplastic charge 372 as the thermoplastic charge 372 is heated to the forming temperature (e.g., as thermoplastic charge 372 is heated above its melting point), as well as during the forming and cooling processes wherein thermoplastic charge 372 is compressed by the rollers to a fully contoured geometry.

Tensioning assembly 420 may include one or more second clips, or clamps, 416 attached to first axial end 402 of thermoplastic charge 372, and one or more third clips, or clamps, 418 attached to second axial end 404 of thermoplastic charge 372. In various embodiments, second clips 416 may extend along an entire circumferential length of first axial end 402 of thermoplastic charge 372 (i.e., from first circumferential end 412 to a second circumferential end opposite first circumferential end 412). In various embodiments, third clips 418 may extend along an entire circumferential length of second axial end 404 of thermoplastic charge 372 (i.e., from first circumferential end 412 to a second circumferential end opposite first circumferential end 412).

Second clips 416 may be coupled to an automated, or "robotic" arm 422. Automated arm 422 may translate (e.g., radially, axially, circumferentially, etc.) relative to mandrel 352 to facilitate application of thermoplastic charge 372 onto mandrel 352. Third clips 418 may be coupled to an automated, or "robotic" arm 424. Automated arm 424 may translate (e.g., radially, axially, circumferentially, etc.) relative to mandrel 352 to facilitate application of thermoplastic charge 372 onto mandrel 352. Automated arms 422, 424 may apply force in opposing directions to thermoplastic charge 372 to minimize wrinkling of thermoplastic charge 372 as the thermoplastic charge 372 is heated to the forming temperature as well as during the forming and cooling processes, wherein thermoplastic charge 372 is compressed by the rollers. In various embodiments, automated arms 422, 424 may be configured to also apply circumferential tension to thermoplastic charge 372. In various embodiments, first clips 410 and/or automated arm 414 may be eliminated. In various embodiments, the edge or area where thermoplastic charge 372 is clipped may be an area that is not heated or remains at a temperature less than the glass transition temperature of thermoplastic charge 372. For example, the areas contacted by first clips 410, second clips 416, and/or third clips 418 may be outside of heating element 382, which tends to facilitate a consistent tension being applied to the fibers of thermoplastic charge 172.

Figure 5:
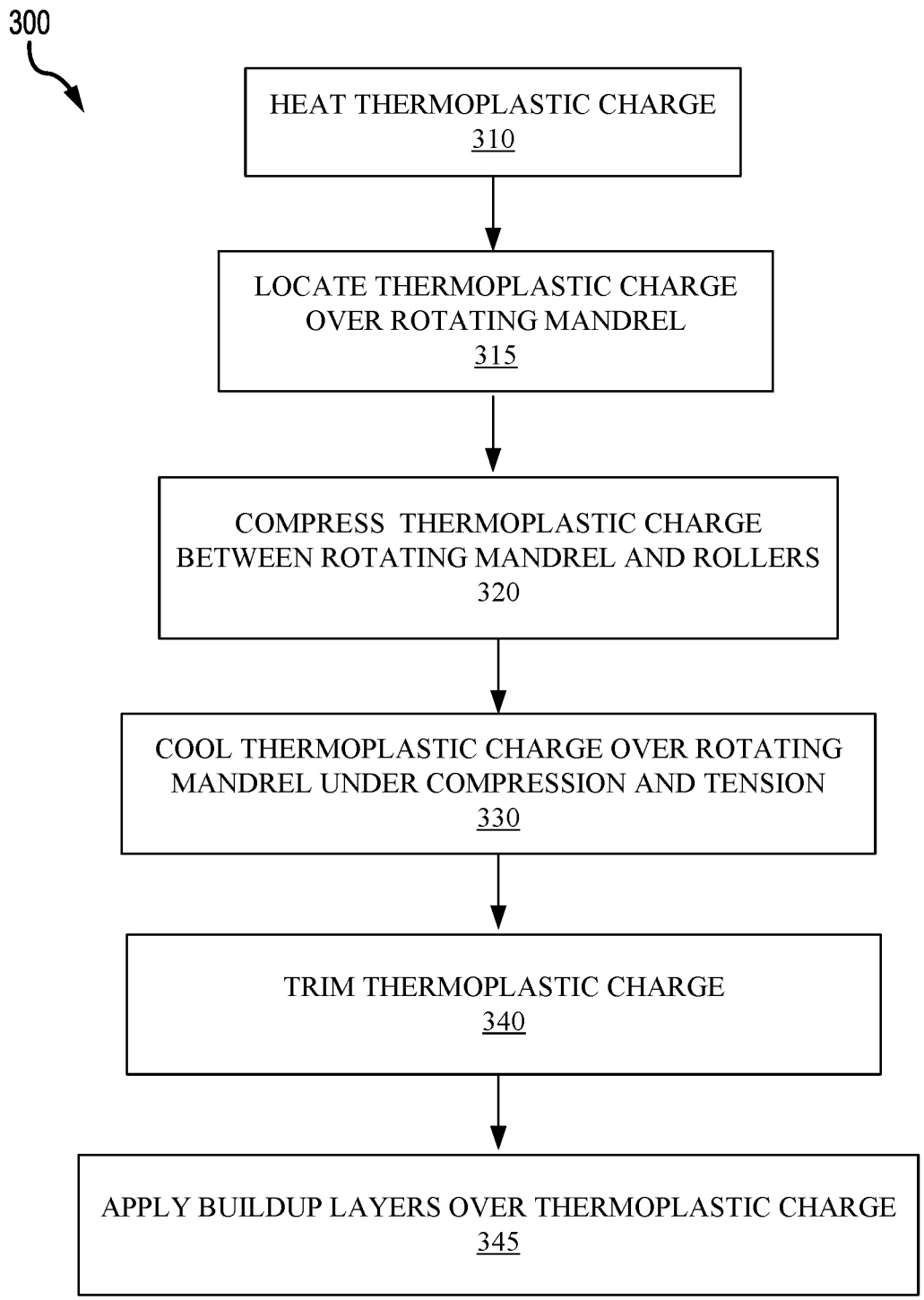
FIG. 5 provides a flow chart for a method for forming a fiber reinforced thermoplastic component, in accordance with various embodiments.

With reference FIG. 5, and continued reference to FIG. 2A, a method 300 for forming a thermoplastic component may include heating a thermoplastic charge to a pliable forming temperature (step 310). Step 310 may include locating first flexible heater 184 and/or second flexible heater 186 over thermoplastic charge 172. Step 310 may include heating thermoplastic charge 172 to a sufficient forming temperature such that the thermoplastic charge 172 becomes pliable for forming purposes. In various embodiments, step 310 includes heating selected portions (e.g., portion 192) of thermoplastic charge 172 by selectively powering only some areas or "zones" of heating element 182. In various embodiments, the forming temperature may be greater than a melting temperature of the thermoplastic charge.

In various embodiments, method 300 may include locating the thermoplastic charge over a rotating mandrel (step 315) and compressing the thermoplastic charge between the rotating mandrel and one or more rollers located radially outward from the mandrel (step 320). Step 320 may include compressing thermoplastic charge 172 between radially outward surface 174 of mandrel 152 and the series of rollers 153 (e.g., first roller 154, second rollers 156a, 156b, third roller 158, and/or fourth rollers 160a, 160b, 160c, 160d). The thermoplastic charge 172 may bend about a mandrel axis 162, in response to being compressed between the series of rollers 153 and mandrel 152. In various embodiments, thermoplastic charge 172 is bent into a semi cylindrical geometry in response to being compressed between the series of rollers 153 and mandrel 152

Method 300 may include cooling the thermoplastic charge to a hardened temperature (step 330). Step 330 may include cooling thermoplastic charge 172 to a hardened temperature. In various embodiments, the hardened temperature may be less than a glass transition temperature of the thermoplastic charge. In various embodiments, step 330 may include directing a cooling airflow toward the thermoplastic charge. In various embodiments, the thermoplastic charge is configured in a "fully contoured" shape while located on mandrel 152. In various embodiments, in order to minimize wrinkling of thermoplastic charge 172, tension may be applied to thermoplastic charge 172 as thermoplastic charge 172 is heated (e.g., during step 310), as well as during the forming process, wherein thermoplastic charge 172 is compressed between the series of rollers 153 and mandrel 152 (e.g., during step 320), as well as during the cooling and/or hardening of thermoplastic charge 172 (e.g., during step 330). Tension may be applied outwardly on thermoplastic charge 172 in essentially all directions to eliminate, or minimize, wrinkling.

Method 300 may further include trimming the thermoplastic charge to a desired shaped (step 340). In various embodiments, step 340 may include trimming thermoplastic charge 172 to form first outer skin 110a and second outer skin 110b. In various embodiments, method 300 may further include applying buildup layers over a surface the thermoplastic charge (step 345). The buildup layers may be added after the thermoplastic charge 172 is hardened (i.e., after step 330). In various embodiments, one or more of the buildup layers may include a stiffener.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for forming a thermoplastic charge, comprising:
   a mandrel configured to receive the thermoplastic charge, wherein the mandrel rotates about a mandrel axis;
   a series of rollers located circumferentially about the mandrel and configured to apply radially inward pressure;
   a heating element located upstream of the series of rollers; and
   a cooling element configured to output an airflow.

2. The system of claim 1, further comprising a tensioning assembly configured to apply force in a first axial direction and a second axial direction opposite the first axial direction.

3. The system of claim 1, wherein the heating element comprises a first flexible heater.

4. The system of claim 1, wherein a first roller of the series of rollers is axially aligned with a first portion of a radially outward surface of the mandrel, the first portion of the radially outward surface being non-parallel to the mandrel axis.

5. The system of claim 4, wherein the series of rollers further comprises a second roller located circumferentially apart from the first roller.

6. The system of claim 5, wherein the second roller is axially aligned with a second portion of the radially outward surface, and wherein an angle of the first portion of the radially outward surface relative to the mandrel axis is greater than an angle of the second portion of the radially outward surface relative to the mandrel axis.

7. A method for forming a thermoplastic component, comprising:
   heating a thermoplastic charge to a forming temperature;
   locating the thermoplastic charge over a rotating mandrel;
   compressing the thermoplastic charge between the rotating mandrel and a series of rollers, wherein heating the thermoplastic charge to the forming temperature includes heating a first portion of the thermoplastic charge prior to the first portion being located radially inward of a first roller of the series of rollers; and
   cooling the thermoplastic charge to a hardened temperature on the rotating mandrel, the hardened temperature being cooler than the forming temperature.

8. The method of claim 7, further comprising applying tension to the thermoplastic charge simultaneously with the heating the thermoplastic charge, the compressing the thermoplastic charge, and the cooling the thermoplastic charge.

9. The method of claim 7, wherein heating the thermoplastic charge to the forming temperature further includes locating a first flexible heater over the thermoplastic charge.

10. The method of claim 9, wherein heating the thermoplastic charge to the forming temperature further includes locating a second flexible heater over the thermoplastic charge.

11. The method of claim 7, further including trimming the thermoplastic charge.

12. The method of claim 11, further comprising forming a buildup layer over the thermoplastic charge.

13. The method of claim 7, wherein cooling the thermoplastic charge to the hardened temperature includes directing a cooling airflow toward the thermoplastic charge.

14. A method for forming a thermoplastic component, comprising:
   heating a thermoplastic charge to a forming temperature;
   locating the thermoplastic charge over a mandrel configured to rotate about a mandrel axis; and
   compressing the thermoplastic charge between the mandrel and a series of rollers, wherein heating the thermoplastic charge to the forming temperature includes heating a first portion of the thermoplastic charge prior to the first portion being located radially inward of a first roller of the series of rollers.

15. The method of claim 14, further comprising disposing a flexible heater on a surface of the thermoplastic charge.

16. The method of claim 14, further comprising cooling the thermoplastic charge to a hardened temperature on the mandrel, the hardened temperature being cooler than the forming temperature.

17. The method of claim 16, wherein the first roller of the series of rollers is axially aligned with a first portion of a radially outward surface of the mandrel, the first portion of the radially outward surface being non-parallel to the mandrel axis.

18. The method of claim 17, wherein the series of rollers further comprises a second roller located circumferentially apart from the first roller, the second roller being axially aligned with a second portion of the radially outward surface, and wherein an angle of the first portion of the radially outward surface relative to the mandrel axis is greater than an angle of the second portion of the radially outward surface relative to the mandrel axis.

\* \* \* \* \*